March 22, 1966     M. DECKER ET AL     3,242,204
PRODUCTION OF ADIPONITRILE
Filed May 14, 1963
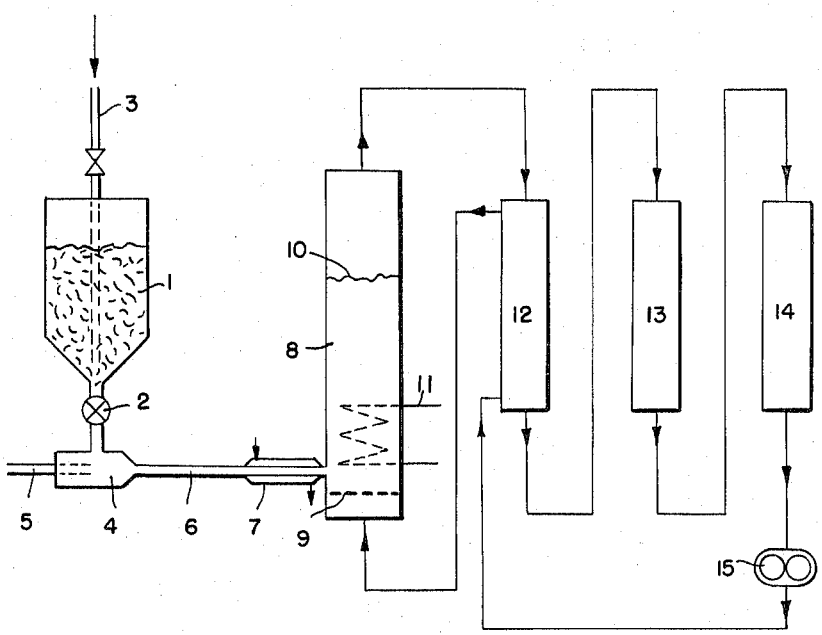
INVENTORS:
MARTIN DECKER
JOSEPH SCHMIDT
HANS JOACHIM PISTOR
HEINRICH SCHOLZ
BY
Margaee, Johnston, Cook & Root
ATT'YS

United States Patent Office 3,242,204
Patented Mar. 22, 1966

3,242,204
PRODUCTION OF ADIPONITRILE
Martin Decker and Joseph Schmidt, Ludwigshafen (Rhine), Hans Joachim Pistor, Walldorf, and Heinrich Scholz, Ludwigshafen (Rhine), Germany, assignors to Badische Anilin- & Soda-Fabrik Aktiengesellschaft, Ludwigshafen (Rhine), Germany
Filed May 14, 1963, Ser. No. 280,242
Claims priority, application Germany, May 18, 1962, B 67,291
7 Claims. (Cl. 260—465.2)

This invention relates to improvements in the production of adiponitrile from adipic acid and ammonia.

It is known to react vaporized adipic acid in the gas phase with ammonia in the presence of catalysts in a fluidized bed at 250° to 550° C. to produce adiponitrile. Cyclopentanone and carbon dioxide are formed during the vaporization of the adipic acid by decomposition in undesirable secondary reactions. Under the reaction conditions required, cyclopentanone reacts to form resinous compounds which on the one hand give a pitchlike residue in the evaporator by decomposition and on the other hand cause carbonaceous deposits on the catalyst which impair its activity. Frequent cleaning of the evaporator, a short life of the catalyst and considerable decrease in yield are the disadvantages of the said method.

In another known method, high-speed rotating-disk evaporators or falling film evaporators are used to provide a mild vaporization. In both cases, the temperature of the evaporator is 320° to 340° C. and the adipic acid vapor is passed into the reaction zone by means of ammonia. This method has the disadvantage that the molten, evaporating adipic acid at high temperature comes intensively into contact with the metal wall of the evaporator and this favors decarboxylation and formation of cyclopentanone. All equipment, pumps and pipes which come into contact with the molten adipic acid must be of corrosion-resistant material. The alloy steels commonly used are not wholly corrosion-proof, while aluminum, although it is resistant, has inadequate dimensional stability under heat. There are also technical difficulties arising from the use of parts which rotate relatively rapidly at high temperatures.

According to another prior art method, the adipic acid is vaporized in a current of hot ammonia in a chamber. The adipic acid is introduced into the evaporation chamber as a dry powder by means of a current of ammonia. This method presupposes the use of well dried initial materials because otherwise metering and conveyance of the adipic acid is disturbed by ammonium salt formation. However, the drying of the initial materials to absolute dryness requires considerable expenditure for equipment. Moreover, the above-mentioned disadvantages are not wholly avoided by this method because the adipic acid vaporizes and is brought to the reaction temperature prior to reaching the bed of catalyst and partial decomposition may therefore take place.

It is an object of the present invention to provide a process for the production of adiponitrile in which the initial material need not be completely dry. It is another object of the invention to provide a process for the production of adiponitrile in which the conveyance of the initial material offers no difficulty. It is a further object of the present invention to provide a process for the production of adiponitrile which presents considerably less corrosion problems than all prior processes for the production of adiponitrile. Yet another object of the present invention is to prevent any losses of adipic acid by decomposition to cyclopentanone and carbon dioxide in the production of adiponitrile from adipic acid. It is finally an object of the present invention to provide a process for the production of adiponitrile by contacting adipic acid and ammonia in the presence of a catalyst, which process ensures a longer life of the catalyst as compared with the life of the catalyst in the prior art processes. These objects and advantages will be better understood from the following detailed description and the accompanying drawing which shows diagrammatically a suitable embodiment of the invention.

These objects are achieved and adiponitrile is obtained in high purity and high yield from adipic acid, which may contain small amounts of water, and ammonia in contact with finely divided catalyst in a fluidized bed at 250° to 550° C., by introducing the adipic acid in solid free-flowing powdered form into a current of ammonia and introducing it by this current at a temperature below 50° C. into a fluidized bed of catalyst heated to reaction temperature and produced by a current of ammonia.

It is advantageous to introduce the adipic acid into the current of ammonia in the presence of a small amount of an inert gas, for example nitrogen, which is also passed through the fluidized bed. The inert gas is advantageously used in an amount of 0.001 to 0.01 part by volume, preferably 0.003 to 0.006 part by volume, for each part by volume of ammonia.

The adipic acid is supplied in powder form, i.e. with a grain size up to about 0.5 mm. Although it is possible to use larger crystals, pneumatic conveyance into the reaction chamber then becomes increasingly difficult.

The process has particular importance for the use of adipic acid such as is obtained by large scale manufacture. This commercial adipic acid contains about 0.1 to 0.2% by weight of water. When used in the prior art methods, this adipic acid must be dried in a separate operation, whereas this is not necessary in the process according to this invention. It is possible to use adipic acid which contains up to about 1% by weight of water.

Until the adipic acid meets the hot catalyst, it remains in solid form in the process according to this invention. Fusion prior to contact with the catalyst is avoided. The ammonia current used for conveyance is therefore kept at a temperature below 50° C. Moreover it is recommendable to cool the path of conveyance immediately prior to the reaction chamber, for example with water, so that melting of the apidic acid and consequent encrustation is avoided.

About 0.2 part by weight of ammonia is required for conveyance of each part by weight of adipic acid. The amount of ammonia required depends to a certain extent on the condition of the adipic acid. As a rule 0.2 to 0.5 cubic metre (S.T.P.) of ammonia is used per kilogram of adipic acid. It is however possible to use a larger amount of ammonia. If the adipic acid available is finely powdered and extremely dry, it will require less amonia for conveyance than a coarsely powdered adipic acid or one having a small content of water. The adipic acid must be flowable or free flowing, i.e. it should not agglomerate or agglutinate in the storage container.

In a preferred embodiment of the invention, the adipic acid/ammonia current is contacted, either ahead of or at the point where it meets the finely particled catalyst, with a current of ammonia flowing perpendicularly or substantially perpendicularly to the direction of flow of the adipic acid/ammonia current. For this second current of ammonia approximately 0.1 to 0.5 cubic metre (S.T.P.) of adipic acid is used. The flow velocity of the second current of ammonia on leaving the nozzle is between approximately 180 and 250 meters per second. As the two currents meet, the adipic acid/ammonia current is distributed and the adipic acid comes into contact with the catalyst especially rapidly, decomposition and carbon deposits thus being reduced. The period for regeneration of the catalyst can in this way be considerably extended. The second current of ammonia may also be introduced at another angle to the adipic acid/ammonia current, but the effect would be less.

Heating of the fluidized bed may be carried out by supplying hot ammonia, by heating by means of a heating jacket or preferably by means of heating elements installed inside the fluidized bed.

The fluidized bed is produced by means of a current of ammonia. It is advantageous to bring the catalyst to the reaction temperature by supplying heat through heating jackets or heating elements in the fluidized bed. The use of gas burners such as are described in German patent specification No. 1,003,190 has proved to be particularly suitable.

The reaction conditions are substantially the same as those in the prior art methods.

The reaction temperature is between 250° and 550° C. Temperatures of 350° to 420° C. are preferred.

The process is usually carried out at atmospheric pressure but may also be carried out under subatmospheric or slight superatmospheric pressure, for example at 1.2 atmospheres gauge.

Silica gel, boron phosphate or catalysts containing phosphoric acid and which may be activated by small amounts of alkali metal oxide may be used as dehydrating catalysts. Phosphoric acid catalysts and boron phosphate catalysts supported on silica gel have proved particularly suitable. They contain about 5 to 20% by weight of phosphoric acid and/or boron phosphate.

Since the catalyst is fluidized during the reaction, grain sizes of 0.1 to 0.4 mm. are preferred.

The amount of catalyst and the current of gas required for the production of the fluidized bed are regulated so that contact times of four to six seconds (with reference to the empty catalyst space under the reaction conditions) are provided for the adipic acid and the conversion product.

The total amount of ammonia used is at least 2 moles per mole of adipic acid. In general, 4 to 20 moles of ammonia is used for each mole of adipic acid, although it is possible to use an even larger excess. In that case the ammonia is preferably recycled. When a small amount of nitrogen is introduced into the cycle during the metering in of the adipic acid, it is advantageous to ensure by branching off an appropriate portion that the nitrogen content of the recycle gas does not exceed 10%.

One embodiment of the process will now be described by way of example with reference to the accompanying diagrammatic drawing. Free-flowing powdered adipic acid is introduced from a storage container 1 through a dosing feeder 2, for example a star feeder, by a current of nitrogen introduced at 3 into a mixing chamber 4 where it is entrained by a current of ammonia entering through a pipe 5 and having a temperature of not more than 50° C. so that the adipic acid is conveyed through a pipe 6 provided at the point of entry into the reaction chamber with a water cooler 7 into a reaction chamber 8. It is advantageous for the cross-section of the pipe from the dosing feeder to the mixing chamber to be kept relatively small so that the amount of nitrogen added may be kept to a minimum. Catalyst is fluidized in the reaction chamber 8 by means of ammonia passed through a sieve plate 9.

The catalyst is heated by means of a heating coil 11. The upper boundary of the fluidized bed is indicated at 10 and above this a gas space is provided for the separation of entrained solid particles. The effluent gases and vapours pass through a heat exchanger 12 and then through coolers 13 and 14. Condensate, i.e. mainly adiponitrile and water, is drained from the heat exchanger and the coolers through suitable pipes (not shown). The reaction products are worked up by conventional methods, for example by separating the organic layer and extracting the aqueous layer with an aromatic hydrocarbon, and distillation of the organic phase. Ammonia vapor is returned to the reaction chamber 8 through the heat exchanger 12 by means of a pump 15. A branch pipe (not shown) is provided for removal of such an amount of ammonianitrogen mixture from the recycle gas that the nitrogen content does not exceed 10% by volume.

The advantages of the process are to be seen in the higher yields and the greater purity of the adiponitrile. For example cyclopentanone is present in the crude adiponitrile only in traces and cyanocyclopentylamine only in an amount of 0.3 to a maximum of 1.0%. The amount of byproducts depends among other things on the throughput. Larger amounts of byproducts form at low throughputs than at high throughputs. Since high loadings of the catalyst are possible according to the new process, for example 600 g. of adipic acid per liter of reaction space per hour, very high space-time yields are achieved.

The invention is further illustrated by the following examples. The parts and percentages specified are by weight.

*Example 1*

4 liters of a silica gel catalyst impregnated with 10% of phosphoric acid is placed in a vertical reactor having a diameter of 100 mm. and a length of 1200 mm. The support for the catalyst is prepared in spherical form by spray drying. It has a grain spectrum of 50 to 300 microns. After having been impregnated with phosphoric acid, the catalyst is subjected to a heat treatment at 300° C.

The bed of catalyst is heated to a temperature of 300° to 400° C. by electrical heating and fluidized by a current of 1000 liters/hour (S.T.P.) of ammonia preheated to 300° C. 1500 g. of adipic acid and a little nitrogen are introduced into this fluidized bed per hour by means of a current of ammonia at the rate of 1000 liters/hour (S.T.P.), the temperature of this ammonia being below 50° C. The reaction products are condensed after leaving the reactor. The organic layer is separated and the aqueous layer is extracted with toluene. The extract and the organic layer are united and distilled. 1140 g. per hour of crude adiponitrile is obtained. By fractionation 94% of the theory of adiponitrile is obtained containing only 0.64% of cyanocyclopentenamine.

*Example 2*

6000 g. of adipic acid is reacted at 400° C. in the course of six hours in a manner similar to that described in Example 1 using 5 liters of a boron phosphate catalyst containing, in addition to boric acid and phosphoric acid, 5% of flake graphite and having a grain size of 200 to 400 microns. The adipic acid together with a little nitrogen is introduced into the fluidized bed by 1000 liters (S.T.P.) of ammonia per hour at a temperature below 50° C.

By working up the reaction product, 4555 g. of crude adiponitrile is obtained from which, after simple distillation and fractionation, 4240 g. (92.8% of the theory) of adiponitrile having a content of 0.8% of cyanocyclopentenamine is obtained.

*Example 3*

300 liters of the catalyst specified in Example 1 is placed in a reaction chamber 400 mm. in diameter and 3400 mm. in length. 70 kg. per hour of adipic acid is introduced by means of a current of ammonia at the rate of 25 cubic metres (S.T.P.) per hour into the catalyst heated to 390° to 400° C. by a gas burner. 350 to 400 liters (S.T.P.) of nitrogen per hour is introduced into the ammonia conveying gas with the adipic acid. Another 50 cubic metres (S.T.P.) of ammonia which has been heated to 250° to 300° C. by the reaction product in a heat exchanger is passed per hour into the reaction chamber through a distributor plate at the bottom. The reaction products are condensed out from the reaction mixture in a heat exchanger and in coolers and the excess ammonia is returned by a blower to the reaction chamber. The nitrogen content in the recycle gas is kept below 5% prior to entry into the reaction chamber by branching off 3 to 4 cubic metres (S.T.P.) per hour of the mixture of ammonia and nitrogen. The organic phase is separated from the reaction product and the aqueous phase is extracted with toluene. An average of 95 to 96% of the theory of adiponitrile free from water and ammonia and having a cyanocyclopentenamine content between 0.4 to 0.7% is obtained from the organic phase by distillation and fractionation.

*Example 4*

3 liters of a catalyst containing 10% of phosphoric acid and 3% of $K_2O$ on a silica gel carrier is placed in a fluidized bed reactor having a diameter of 80 mm. and a length of 1000 mm. The catalyst is heated to 380° to 400° C. and 1800 g. per hour of adipic acid protected with a little nitrogen is blown in per hour by 800 liters (S.T.P.) per hour of ammonia at room temperature. 600 liters (S.T.P.) per hour of ammonia is heated to about 300° C. in a gas preheater and passed into the fluidized bed through a distributor plate. By condensing the reaction products, 1360 g. per hour of crude adiponitrile is obtained which yields 1252 g. of adiponitrile (94% of the theory) having a cyanocyclopentenamine content of 0.24% by fractional distillation under subatmospheric pressure.

Similar results are obtained with catalysts which contain a small amount of lithium oxide or sodium oxide instead of potassium oxide.

*Example 5*

2 cubic metres of a silica gel catalyst impregnated with 10% of phosphoric acid is placed in a vertical reactor having a length of 6 m. and a diameter of 1000 mm. The support for the catalyst is prepared in spherical form by spray drying and has a grain spectrum of 50 to 300 microns. After drying, the catalyst is heated to 400° C. in a current of air.

The reactor is provided with heating elements by which the catalyst is heated to 380° C. At the bottom of the reactor, 200 cubic metres (S.T.P.) of ammonia heated to 250° C. is introduced per hour and this serves to fluidize the catalyst arranged above a sieve plate. Above the sieve plate a total of 360 kg. of powdered adipic acid protected by 0.8 cubic metre (S.T.P.) of nitrogen is introduced through two feed pipes. 310 cubic metres (S.T.P.) of ammonia per hour per feed pipe is used for conveying the adipic acid. At the outlet end of each feed pipe two nozzles are arranged. The nozzles have slot-shaped openings of 0.5 cm.$^2$. 40 cubic metres (S.T.P.) of ammonia is introduced through the four nozzles per hour. The velocity of the gas in the nozzles is 200 metres per second. The nozzles are arranged so that the gas from the nozzles impinges on the adipic acid/ammonia mixture from the feed pipe at a right angle. The nozzles are arranged opposite each other, but are slightly staggered to ensure efficient distribution of the mixture.

On leaving the reactor the reaction products are condensed. The organic layer is separated and the aqueous layer extracted with toluene. The extract and the organic layer are united and distilled. 270 kg. of crude adiponitrile is obtained per hour. On fractionation, 256 kg. (95% of the theory) of adiponitrile is obtained which contains 0.5% cyanocyclopentenamine.

The activity of the catalyst subsides after 10 days and the catalyst is then regenerated.

If nozzles are not provided, the catalyst has to be regenerated after 6 days.

We claim:

1. In a process for the production of adiponitrile by reacting adipic acid with ammonia at a reaction temperature of about 250° to 550° C. and in the presence of a dehydration catalyst, the improvement which comprises entraining said adipic acid in the solid state as a powder in a current of gaseous ammonia and introducing said adipic acid by this current at a temperature below 50° C. into a fluidized bed of finely divided catalyst which is maintained at a temperature of 250° to 550° C., for contact of the solid adipic acid with said fluidized catalyst.

2. A process as claimed in claim 1 in which said adipic acid has a water content up to 1.0% by weight.

3. A process as claimed in claim 2 in which the entrainment of the adipic acid in the current of gaseous ammonia is carried out in the presence of 0.1 to 2% by volume with reference to the ammonia of an inert gas and said inert gas is also passed through the fluidized bed.

4. A process as claimed in claim 2 in which the fluidized bed is heated to the reaction temperature solely by means of heating elements within the fluidized bed.

5. A process as claimed in claim 2 in which the adipic acid entrained by said current of gaseous ammonia is maintained in the solid state by indirect heat exchange with a cooling medium in the path of the ammonia current immediately prior to entry into the reaction zone.

6. A process as claimed in claim 2 in which the ammonia current containing adipic acid is contacted prior to entry into the fluidized catalyst with another current of gaseous ammonia which is supplied at a right angle to the ammonia current containing adipic acid.

7. A process as claimed in claim 2 in which the catalyst is selected from the group consisting of phosphoric acid supported on silica and boron phosphate supported on silica.

References Cited by the Examiner

UNITED STATES PATENTS 2,904,580   9/1959   Idol _____ 260—465.3
3,070,621   12/1962  Lind _____ 260—465

FOREIGN PATENTS 877,664   9/1961   Great Britain.

CHARLES B. PARKER, *Primary Examiner.*